US008892715B2

(12) United States Patent
Kenward (10) Patent No.: US 8,892,715 B2
(45) Date of Patent: *Nov. 18, 2014

(54) SYSTEMS AND METHODS FACILITATING RELOCATABILITY OF DEVICES BETWEEN NETWORKS (71) Applicant: Apple Inc., Cupertino, CA (US)

(72) Inventor: Gary W. Kenward, Manotick (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/190,622

(22) Filed: Feb. 26, 2014

(65) Prior Publication Data
US 2014/0169333 A1 Jun. 19, 2014

Related U.S. Application Data (63) Continuation of application No. 10/179,956, filed on Jun. 26, 2002, now Pat. No. 8,667,105.

(51) Int. Cl.
G06F 15/173 (2006.01)
G06F 15/16 (2006.01)
H04L 29/08 (2006.01)
H04W 36/14 (2009.01)

(52) U.S. Cl.
CPC ......... H04W 36/14 (2013.01); H04L 29/08072 (2013.01)
USPC ........... 709/223; 709/201; 709/202; 709/203; 709/217; 709/218; 709/219; 709/220; 709/221; 709/222; 709/224; 709/225; 709/226; 709/227; 709/238; 379/211.02; 379/272; 379/219; 455/414.1; 455/436; 455/463; 719/316; 719/317

(58) Field of Classification Search
USPC ........ 709/201, 202, 203, 217, 218, 219, 220, 709/221, 222, 223, 224, 225, 226, 227, 709/238; 370/331, 352, 388, 389, 329, 401; 379/211.02, 272, 219; 455/414.1, 11, 455/436, 463; 719/316, 317; 701/207
See application file for complete search history.

(56) References Cited

U.S. PATENT DOCUMENTS

| | | | |
|---|---|---|---|
| 5,603,031 A | 2/1997 | White et al. | |
| 5,966,451 A * | 10/1999 | Utsumi | 380/51 |
| 6,144,671 A * | 11/2000 | Perinpanathan et al. | 370/409 |
| 6,163,794 A | 12/2000 | Lange et al. | |
| 6,188,684 B1 * | 2/2001 | Setoyama et al. | 370/352 |
| 6,278,861 B1 * | 8/2001 | Ward et al. | 455/13.1 |
| 6,327,533 B1 * | 12/2001 | Chou | 701/500 |
| 6,407,988 B1 * | 6/2002 | Agraharam et al. | 370/328 |
| 6,501,767 B1 * | 12/2002 | Inoue et al. | 370/465 |
| 6,515,974 B1 * | 2/2003 | Inoue et al. | 370/331 |
| 6,693,912 B1 * | 2/2004 | Wang | 370/401 |
| 6,742,036 B1 * | 5/2004 | Das et al. | 709/226 |
| 6,891,819 B1 * | 5/2005 | Inoue et al. | 370/338 |
| 6,950,407 B1 * | 9/2005 | Huddle | 370/254 |
| 6,980,802 B2 * | 12/2005 | Jung | 455/436 |
| 7,010,303 B2 * | 3/2006 | Lewis et al. | 455/445 |

(Continued)

Primary Examiner — Saket K Daftuar
(74) Attorney, Agent, or Firm — Meyertons, Hood, Kivlin, Kowert & Goetzel, P.C.

(57) ABSTRACT

Provided is a software entity adapted to operate in a first network on behalf of a relocatable device to negotiate services for the relocatable device from the network, and to be transportable or replicable to operate in a second network to negotiate services for the relocatable device from the second network.

16 Claims, 4 Drawing Sheets

(56) References Cited

U.S. PATENT DOCUMENTS

| | | | |
|---|---|---|---|
| 7,031,718 B2* | 4/2006 | Jouppi et al. | 455/450 |
| 7,124,415 B1* | 10/2006 | Luft | 719/317 |
| 7,171,684 B1* | 1/2007 | Marquet et al. | 726/14 |
| 7,212,505 B2* | 5/2007 | Saint-Hilaire et al. | 370/328 |
| 7,236,787 B1* | 6/2007 | Tamura et al. | 455/437 |
| 7,254,645 B2* | 8/2007 | Nishi | 709/249 |
| 7,281,056 B1* | 10/2007 | Nolan et al. | 709/232 |
| 7,339,903 B2* | 3/2008 | O'Neill | 370/313 |
| 7,746,873 B2* | 6/2010 | Saito et al. | 370/400 |
| 2001/0012777 A1* | 8/2001 | Igarashi et al. | 455/435 |
| 2001/0016492 A1* | 8/2001 | Igarashi et al. | 455/433 |
| 2001/0027484 A1* | 10/2001 | Nishi | 709/223 |
| 2002/0021680 A1* | 2/2002 | Chen | 370/331 |
| 2002/0059452 A1* | 5/2002 | Yokota et al. | 709/238 |
| 2002/0095311 A1* | 7/2002 | Donahue | 705/1 |
| 2002/0144269 A1* | 10/2002 | Connelly | 725/49 |
| 2002/0174207 A1* | 11/2002 | Battou | 709/223 |
| 2002/0176131 A1* | 11/2002 | Walters et al. | 359/118 |
| 2002/0198937 A1* | 12/2002 | Diwan et al. | 709/203 |
| 2003/0005152 A1* | 1/2003 | Diwan et al. | 709/239 |
| 2003/0014315 A1* | 1/2003 | Jaalinoja et al. | 705/18 |
| 2003/0061361 A1* | 3/2003 | Bacik et al. | 709/228 |

* cited by examiner

SYSTEMS AND METHODS FACILITATING RELOCATABILITY OF DEVICES BETWEEN NETWORKS

CROSS-REFERENCE TO RELATED APPLICATIONS

This application is a continuation of U.S. patent application Ser. No. 10/179,956, entitled "Systems and Methods Facilitating Relocatability of Devices Between Networks," filed Jun. 26, 2002, having inventor Gary W. Kenward, which is herein incorporated by reference in its entirety as though fully and completely set forth herein.

FIELD OF THE INVENTION

The invention relates to systems and methods facilitating relocatability of devices between networks.

BACKGROUND OF THE INVENTION

Networks provide services to end user devices connected either by wireless or wireline links. Traditional approaches to service establishment and maintenance typically rely upon the definition of a predetermined set of services and service features, and one or more protocols to communicate the request for a selected service from the end user device to the network. With the proliferation of services and service capabilities, end user device types, access technologies, network architectures and network operators, establishing a service definition and signalling protocols to fit all cases is becoming more and more difficult.

In addition, the total quantity of both networks and devices is increasing dramatically, as well as the situations in which these entities are required to communicate with each other. End user devices are no longer tied to a single access point, as nomadicity and continuously connected ("always-on") mobility are becoming common requirements for communications and computing devices.

The need to communicate over narrow band wireline and wireless, and mobile wireless channels means that increasing the complexity of the signalling protocols is not a good option to adopt. Establishing a communications service between an end user device and a network incurs significant bandwidth overhead and delay, particularly if the exchange involved negotiation. Using bandwidth for signalling means fewer users can be supported, regardless of the access medium, and high set-up delays are often perceived as poor service offering. The latter is a particular problem when trying to sustain a service through the handover of the end user device between different access points. In this case, long delays can easily translate to transient but noticeable interruptions in the service which diminish the usefulness of device mobility.

Current wireless networks—for example IS-51, IS-95, IS-136, IS-2000, GSM, UMTS—use standardized definitions of the services, and the protocols to be used in negotiating service support. The service context support is built into the product offerings based upon the standard definitions. This approach works for the most part because effectively only two services are supported, namely conversational voice, and short messaging (best effort packet data). A number of standards bodies are currently struggling with defining technology solutions that support data service sustainment during handover between networks of different types or networks supported by different operators.

Intelligent networks, such as IN and AIN used client-server architectures and extensive signalling (SS7) to allow the user to request a limited set of network services. Some attempt was made to define a solution for general service application access, using the same client server model and a contract negotiation model.

There are a number of methods whereby networks store customization information at the end users device. In some situations, this information represents the result of a negotiation. WWW "cookies" are used to store application and sometimes relevant user information at the end user's computing device. WWW cookies are notorious for being invasive to the end-users device, and are primarily there for the convenience of the service provider, not the end user.

Telescript (General Magic Inc.) is an object relocation technology (U.S. Pat. No. 5,603,031) that allows objects to be proliferated to other platforms, and then used at those platforms. The primary known application of this technology is for the distribution of application objects to user devices. In short, the technology was used to allow the network to add new capability to the user device. Java (Sun Microsystems Inc.) and Java++ (Microsoft Corporation), also provide capabilities for relocating software objects onto other nodes in a network.

These existing technologies do not provide a solution for inter-technology mobility, nor service renegotiation, nor a solution that permits the end users to negotiate services according to their specific needs, across all forms of access networks, and for any number of applications.

Current signalling model solutions presume a defined set of services and do not typically provide for customization of support for an individual user and the user's preferred applications. This will become more of an issue as the variety of user devices and applications increase. Typical signalling solutions are either based upon the "lowest common denominator" approach or provide specific solutions for each specific service that is to be supported. The former is not user-friendly, and the latter tends to generate an abundance of service specific signalling solutions (e.g. WAP, RSVP, SS7, SIP). In either case, introduction of new, or custom devices or applications is severely impeded.

SUMMARY OF THE INVENTION

Advantageously, the Context Procurator for the most part eliminates the overhead and delay issues with service negotiation by moving all of the negotiation from the end user device to within the network, where there are more resources to perform the necessary communications exchanges and perform them quickly.

The CP also alleviates the need for the creation of fixed service sets and service features, and the supporting signalling protocols. Each end user can build a CP knowledge base using the configuration of their device and the applications and networks they use. For example, a particular end user device might have a GPRS modem, an 802.11 modem, some TCP/IP and HTTP applications, and a VoIP application; and, the end user might have a service contract with a wireline DSL service provider, two cellular providers (one in Canada and one in the US), and ten 802.11 LAN service providers (one for Starbuck's, one for the airport, one for the local university, one for the downtown, etc.). This knowledge of the specifics of the end users needs, is encapsulated within the CP, along with the rules for using the knowledge to negotiate a supporting service.

Once the CP is created, advantageously minimal signalling is required between end user device and network to initiate negotiation of a service. No end user device to network signalling is required for renegotiation of the service during mobility (or other change in available service).

Service establishment and maintenance is an intrinsic capability in all but the most trivial of communications networks. The Context Procurator (CP) provides the capability to support these essential functions, as well as robustness in service support during changing network conditions such as node or link failures, traffic management, inter- and intra-network handover, and so forth, with a minimal amount of end user device to network signalling.

The CP allows the service negotiation to be separated from forwarding and resource management fabric of the network and allows the negotiated service to be tailored to the end user device without pushing the service support to the edge of the network. The creation, relocation and administration of CPs can be orchestrated at a high layer in the protocol stack, and thus CPs can be implemented in selected nodes within a network, and their presence and operation will be transparent to all other non-CP aware nodes. New services can be supported without modifying the basic data communications functions of the network and service evolution is decoupled from the networking equipment. The CP-aware products are engineered to support object relocation and execution and local service negotiation, but only the CP-aware products need this support capability.

The end user device only needs to know the protocols and data structures for building and interacting with its associated CP. Default CPs can be defined to interact with end user devices that are not CP-aware; devices that use traditional service signalling protocols or implicit service signalling.

Because of these characteristics, CPs are applicable to any switching, routing or communications management product.

According to one broad aspect, the invention provides a software entity adapted to operate in a first network on behalf of a relocatable device to negotiate services for the relocatable device from the network, and to be transportable or replicable to operate in a second network to negotiate services for the relocatable device from the second network.

In some embodiments, the software entity comprises a first interface to communicate with the relocatable device.

In some embodiments, the software entity comprises a second interface to communicate with a network service provider entity of a network within which the software entity is operating.

In some embodiments, the software entity comprises a third interface to communicate with a run-time engine in the network within which the software entity is operating, the run-time engine being responsible for running the software entity.

In some embodiments, the software entity further comprises a fourth interface to communicate with a relocation service responsible for transporting or replicating the software entity from the first network to the second network.

In some embodiments, the software entity is adapted to represent a relocatable device which is a wireless terminal.

In some embodiments, the software entity is adapted to represent a relocatable device which is a wired terminal.

In some embodiments, the software entity is in the form of an object or set of objects capable of being transferred using a relocation service which is an object relocation service.

In some embodiments, the software entity is adapted to relocate itself proactively in advance of a move of the relocatable device from the first network to the second network.

In some embodiments, the software entity is adapted to relocate itself reactively in response to a move of the relocatable device from the first network to the second network.

In some embodiments, the software entity is adapted to support custom service signalling and custom service negotiation for the relocatable device according to a user's preferences with minimal signalling overhead on a link between the network and the relocatable device.

According to one broad aspect, the invention provides a computer readable medium having stored thereon a software entity adapted to represent a relocatable device in a plurality of networks, the software entity comprising means for interfacing with a relocatable device; means for interfacing with a network service provider entity of the network of said plurality of networks within which the software entity resides; means for storing a negotiating basis in respect of the relocatable device; means for negotiating adapted to negotiate with the network of said plurality of networks within which the software entity resides, through the means for interfacing with a network service provider entity, services on behalf of the relocatable device using the negotiating basis, the software entity being adapted to be relocated or replicated in another of said plurality of networks.

In some embodiments, the software entity further comprises means for communicating with a run-time engine responsible for running the software entity; means for interfacing with a relocation service to relocate or replicate the software entity in another network of said plurality of networks.

In some embodiments, the software entity further comprises means for a relocatable device to receive an input specifying that the relocatable device is going to disconnect from the network of said plurality of networks within which the software entity resides and reconnect to the another network; the software entity being adapted to relocate itself to the another network upon receipt of such an input.

In some embodiments, the software entity further comprises means for receiving an input indicating the relocatable device has moved or will be moving its point of attachment from the network of said plurality of networks in which the software entity resides to a point of attachment of said another network; the software entity being adapted to replicate or relocate itself to said another network upon receipt of such an input.

In some embodiments, said means for interfacing with a network service provider entity of the network of said plurality of networks is adapted to communicate using a plurality of different protocol interfaces.

In some embodiments, the software entity is further adapted to make changes to the negotiation basis as a function of inputs associated with the relocatable device.

In some embodiments, the software entity is further adapted to propagate any changes to the negotiation basis to any replicas of the software entities that may exist.

In some embodiments, the software entity is further adapted to communicate with the relocatable device using a customizable protocol.

In some embodiments, the software entity is further adapted to support custom service signalling and custom service negotiation for the relocatable device according to a user's preferences with minimal signalling overhead on a link between the network and the relocatable device.

According to one broad aspect, the invention provides a system comprising a plurality of networks, each network having at least one component comprising a re-locatable software entity run-time engine; for each of a plurality of relocatable devices a respective software entity, each software entity being adapted to operate in any of the plurality of networks on behalf of the respective relocatable device to negotiate services for the relocatable device from the network within which the software entity operates; a relocation service adapted to relocate or replicate each software entity from one network to another network of said plurality of networks.

In some embodiments, each software entity comprises a first interface to communicate with the relocatable device; a second interface to communicate with a network service provider entity of the network within which the software entity is operating; a third interface to communicate with a run-time engine in the network within which the software entity is operating, the run-time engine being responsible for running the software entity.

In some embodiments, each software entity comprises a fourth interface to communicate with a relocation service responsible for transporting or replicating the software entity from the first network to the second network.

In some embodiments, each software entity is adapted to represent a relocatable device which is a wireless terminal.

In some embodiments, each software entity is adapted to represent a relocatable device which is a wired terminal.

In some embodiments, each software entity is in the form of an object or set of objects capable of being transferred using the relocation service which is an object relocation service.

In some embodiments, the system is adapted to relocate the context procurator entity of a given relocatable device proactively in advance of a move of the relocatable device from the one network to the another network.

In some embodiments, the system is adapted to relocate the context procurator entity of a given relocatable device reactively in response to a move of the relocatable device from the one network to the another network.

In some embodiments, each software entity comprises means for storing a negotiating basis in respect of the relocatable device; means for negotiating adapted to negotiate with the network of said plurality of networks within which the software entity resides, through the means for interfacing with a network service provider entity, services on behalf of the relocatable device using the negotiating basis.

In some embodiments, said interface for interfacing with a network service provider entity of the network of said plurality of networks is adapted to communicate using a plurality of different protocol interfaces.

In some embodiments, the software entity is further adapted to make changes to the negotiation basis as a function of inputs associated with the relocatable device.

In some embodiments, the system is further adapted to propagate any changes to the negotiation basis to any replicas of the software entities that may exist.

In some embodiments, each software entity is adapted to support custom service signalling and custom service negotiation for the relocatable device according to a user's preferences with minimal signalling overhead on a link between the network and the relocatable device.

According to one broad aspect, the invention provides a method comprising providing a software entity adapted to operate in a first network on behalf of a relocatable device to negotiate services for the relocatable device from the first network; upon receiving an input indicating that the relocatable device has or may charge its point of attachment to a second network, relocating or replicating the software entity to the second network to negotiate services for the relocatable device from the second network.

According to one broad aspect, the invention provides a software entity adapted to operate in a first network on behalf of a plurality of relocatable devices to negotiate services for the relocatable devices from the network, and to be transportable or replicable to operate in a second network to negotiate services for the relocatable devices from the second network.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

In a static homogeneously configured network (any collection of nodes) every node has the substantially same functionality, and if an end user device moves to a new attachment point, the same service can be requested again. Context transfer described in applicant's copending application Ser. No. 10/115,086 filed Apr. 4, 2002 entitled "Context Transfer Systems and Methods in Support of Mobility" assigned to the same entity as this application, hereby incorporated by reference in its entirety, teaches systems and methods which allow context information to be moved from one node to another. Typically, this assumes that nodes to which the context information is being transferred will use the context information in the same way. If the nodes are different (type, provider, etc.) then a signalling protocol can be used to negotiate a compromise. The definition of this signalling protocol must be done before hand. This is an acceptable arrangement if a small number, for example two, of different types of service/network/operator are involved. However in the presence of a multitude of such network types, this approach becomes unruly. Inevitably this requires that the end user device be involved in renegotiating a compromise.

It would be advantageous if once an end user device has established an agreement with a network for a service, the end user device should not have to do any more work (signalling) as this uses up valuable and scarce processing and communications resources. According to an embodiment of the invention, a software entity is provided which resides in the network acting on behalf of the end user device which is responsible for maintaining the service. This software entity understands what the end user device wants, and carries knowledge of how the end user device wants services to be set up.

Such a software entity is capable of moving to new nodes or networks and performs negotiations on behalf of the end user device. Such a software entity needs the end user device's static context info, and also needs to know how the end user device behaves when requesting new services. This takes away the burden of re-negotiation from the end user device, localizes renegotiation to within networks where there are plenty of communications resources and processing power.

The software entity is active, performing negotiations with service domains (as opposed to single nodes). The software entity gets re-located to points where it can negotiate with the network. The software entity is trusted by the end user device to act in its best interest.

An embodiment of the invention provides an intelligent software entity referred to herein as the Context Procurator (CP). The functional role of the CP is to facilitate the establishment and maintenance of data services as an end user device changes access points within a single operator's network, between different operator's networks, and/or between access points that may use different communications technologies. Such a change in points of access results in a change in communications paths through the network used by the end user. In this context, mobility of the end user implies any scenario where the end user device is changing its point of attachment to the network, and includes, but is not limited to, pick and place wired and wireline access, nomadic wired and wireless access, pedestrian wireless access and mobile wireless access. It also applies to scenarios where the mobile device is actually the edge router or switch for a subnetwork serving one or more end users.

The Context Procurator is a software entity that is associated with the data flows originated by, or destined to, a mobile end user device. These flows are provided a particular service, or collection of services by a network which may for example support data forwarding and forwarding performance quality of service, security, compression, virtual private networking, multicast, and other capabilities required by the end user device. The responsibility of the CP is to negotiate locally with the network on behalf of the end user device for the service support that best suits the communications needs of the end user's application. The CP is associated with the end user device, not the network, and while it must operate in accordance to the rules for a given network, its fealty is to the end user device.

Figure 1:
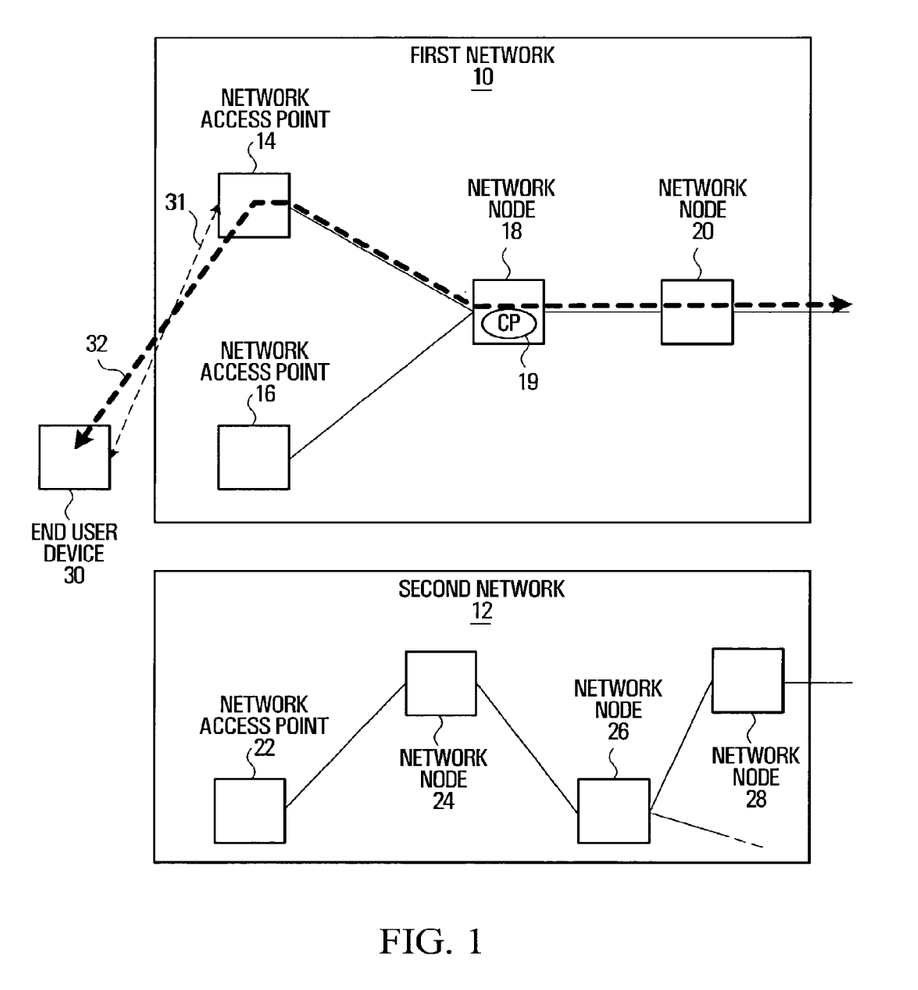
FIGS. 1 to 3 show a conceptual network reference architecture in which a context procurator relocation is being implemented.

Referring now to FIG. 1 shown is an example conceptual network reference architecture which will be used to describe an embodiment of the invention. In the illustrated example, portions of two networks 10,12 are shown. The first network 10 has two network access points 14,16, and two network nodes 18,20. In FIG. 1, an end user device 30 (more generally, any relocatable device, such as a mobile router) has a connection 31 to one of the network access points 14 of the first network 10, and a communications path 32 is shown through the first network 10. The end user device 30 has a context procurator 19 shown in the first network 10 residing on the network node 18. More generally, the context procurator 19 of the end user device 30 can be located anywhere within the first network 10 where it is capable of negotiating services with the first network 10 on behalf of the end user device 30. The second network 12 has a network access point 22, and three network nodes 24,26,28.

Figure 2:
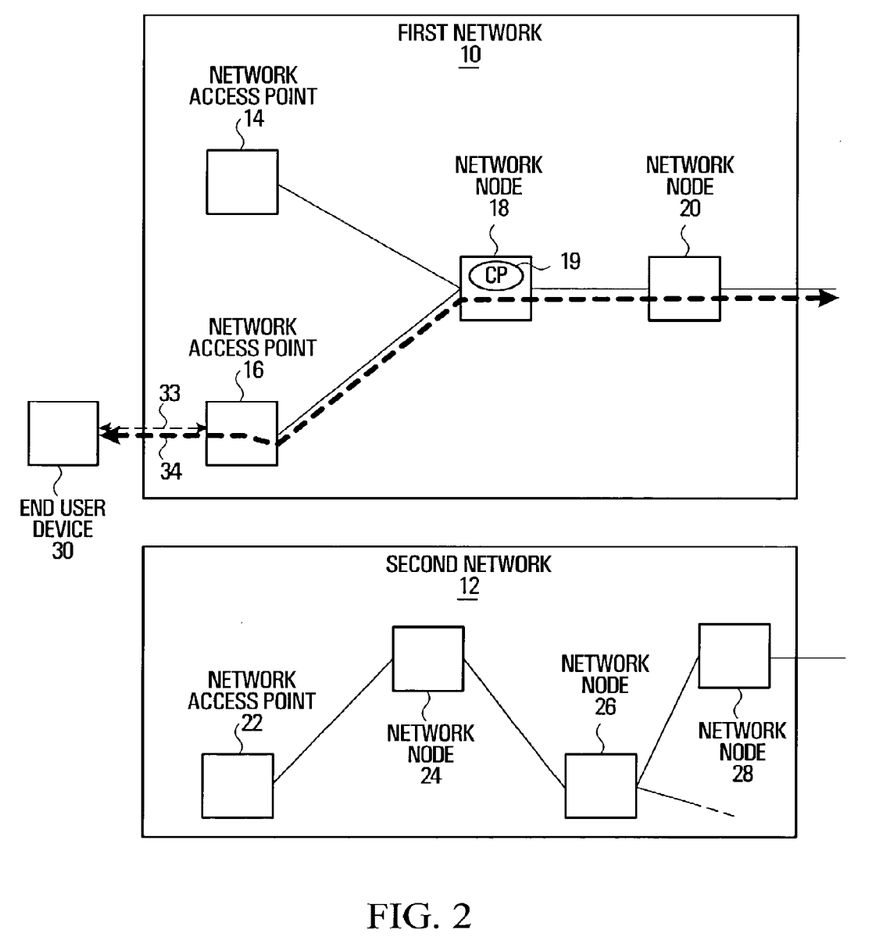

Referring now to FIG. 2, shown is the reference architecture of FIG. 1 a period of time later after which the end user device 30 has changed its point of attachment. It now has a connection 33 with the second network access point 16 in the first network 10, and a communications path 34 through the network 10 which takes a slightly different route. However, the communications path 34 is still within the first network 10 and as such the context procurator 19 of the end user device 30 does not need to be relocated, and the context procurator 19 can continue to represent the end user device 30 within the first network 10.

Figure 3:
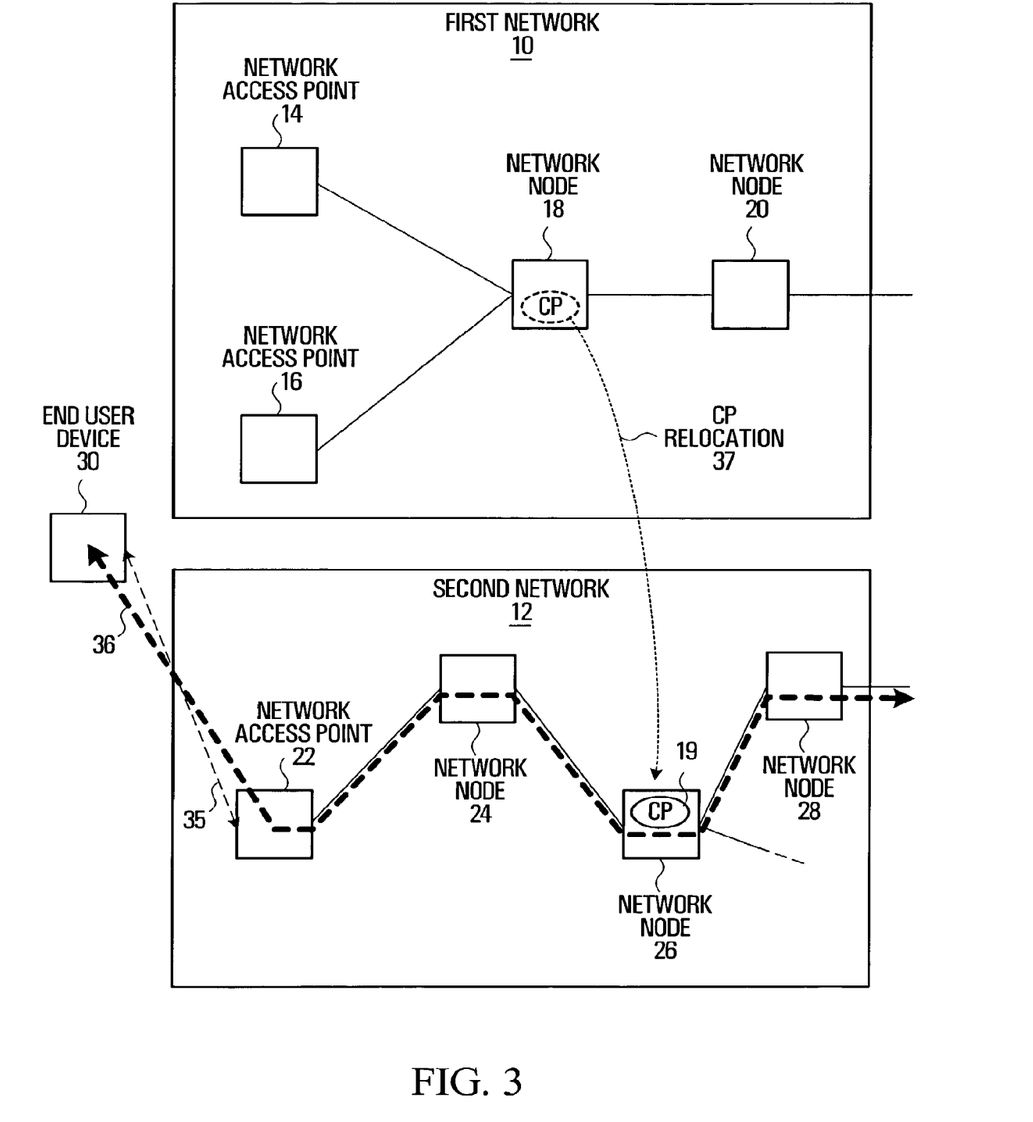

Referring now to FIG. 3, shown is the reference architecture of FIG. 2 a period of time later after which the end user device 30 has changed its point of attachment again. It now has a connection 35 with the network access point 22 of the second network 12, and a communications path 36 through the second network 12 is also shown. In this case, the new attachment point 22 is within a different network from the previous attachment point, and as such the context procurator 19 of the end user device 30 needs to be relocated to the second network 12. This is illustrated diagrammatically with CP relocation arrow 37 which represents the relocation of the context procurator 19 from the first network 10 to the second network 12. In the illustrated example, it is shown residing on network node 26 of the second network 12. The context procurator 19 thus relocated is now capable of representing the end user device 30 in the second network 12 to negotiate services for the end user device from the second network. CP relocation arrow 37 indicates the logical relocation of the CP. The actual transfer of the CP takes place along normal communication paths between the two nodes in the separate networks. A special communications path between the two nodes is neither implied nor required.

The CP 19 uses a stored knowledge base of the user's definitions of service to drive its negotiations with a network. In cases where the services available are not precisely the services needed for the users data flows, the CP's knowledge base includes rules for negotiating an appropriate compromise.

In some embodiments, this service negotiation between the CP and supporting network happens at the initiation of a data communications session and the establishment of a communications path through the network. It also may happen each time the end user device changes access points and, as a result, a portion of the communications path changes. A path change requires a change in infrastructure equipment and transmission paths that are supporting these flows. Each of these network components along the new portion of the path must be able to support the same or similar services provided along the old path. In many situations, the new components will have different service capabilities from the previous components. One major example of this type of situation would be when a users device moves from a cellular access point (e.g. GSM or UMTS) to a wireless local area network access point (e.g. 802.11, Bluetooth or HyperLAN).

In some embodiments, the CP is not relocated until after the end user device has changed its point of attachment.

In another embodiment, the CP is replicated within each network as a point of attachment of that network become a candidate for receiving the traffic of the end user device. This may involve multiple CP replications. In this case, the CP acts as an advance agent—the anthropomorphic analogy being the advance agents for entertainers on tour whose job it is to ensure that the venue for the performance at the next stop in the tour is properly staged. Similar to the human advance agent, an advantage of the CP is that it acts locally to negotiate the appropriate services. Since, in a mobile environment, a change of access points cannot be predicted with any assurance, therefore, as indicated above the CP for a particular end user device must actually replicate itself at a possible new path location, rather than relocate. To prevent proliferation of instances of a CP for a particular user device, preferably each clone of the CP also destroys itself when it is no longer needed.

Finally, while the emphasis in the above description is on service establishment and service maintenance during end user mobility, in some embodiments the CP will re-negotiate local network services in response to any change in the prior service. The CP can renegotiate in reaction to, for example: network requests to downgrade service perhaps for load balancing or fault recovery purpose; network initiated changes in the charging rate for services; and so forth.

Figure 4:
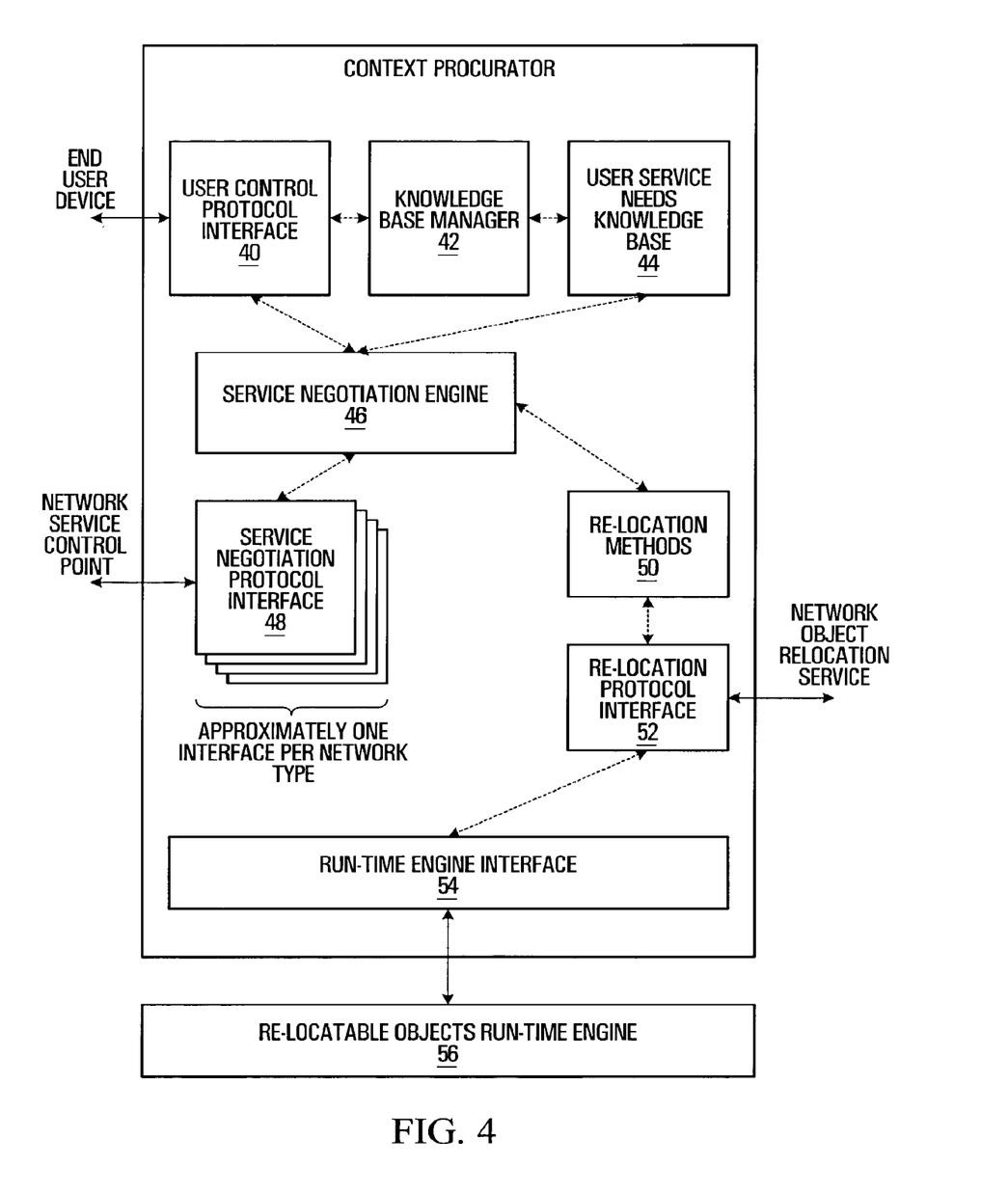
FIG. 4 is a high level logical model for the context procurator of FIGS. 1 to 3.

An example logical structure of the CP is shown in FIG. 4. It is to be clearly understood that many logical structures may be employed to deliver the CP functionality described herein. The CP has a user control protocol interface 40 through which it is capable of communicating with the end user device. As indicated previously, the CP is located in a node somewhere within the network. The network will provide a transport capability between the end user device and the node on which the CP is located. This provides the required connectivity between the end user device and the node running the CP.

There are one or more protocols for communications between the CP and the service control points of the network. These protocols may be different for different types of services and for different types of networks.

There is a user service needs knowledge base 44 containing information identifying the needs of the particular user, and a knowledge base manager 42 responsible for maintaining the contents of the user service needs knowledge base 44. The user service needs knowledge base 44 identifies for example one or more of services needs, fallback positions etc., and/or sets of rules allowing decisions to be made. More generally, the user service need knowledge base 44 contains any information required to allow the CP to negotiate with the network on behalf of the end user device, and the form of this information will likely vary for different implementations.

There is a service negotiation engine 46 responsible for retrieving and interpreting information captured in the user service needs knowledge base 44, and for negotiating with network service control points through service negotiation protocol interfaces 48, of which there is approximately one interface per network type to be supported.

The service negotiation engine 46 retrieves the information out of the user service needs knowledge base 44, and makes decisions as to services to be requested/accepted. The service negotiation engine 46 operates starting with a requirement for a service. This may be a request for the service from the end user device. Alternatively, after CP relocation or replication, the service may simply be the same service being delivered on the previous network which needs to be set up on the new network. The service negotiation engine 46 makes a request for the service through the appropriate service negotiation protocol interface 48 through which is received a response which might for example be either nothing, yes, no, or a suggested alternative. The negotiating party on behalf of the network might for example be a service control point (SCP), a Policy Management System (PMS), Policy Manager (PM), Policy Management Server (PMS), a Network Management System (NMS), Network Manager (NM), Network Management Server (NMS), Network Operations and Management System (NOMS), or any other entity so designated. The service negotiation engine 46 then processes this response and makes decision as to whether to accept the response, respond with a counter-offer or launch a new request. This is a negotiation process which typically will simply mimic the type of negotiating which would be performed by the end user device itself, but without the requirement for extensive signalling between the network and the end user device. Such negotiation processes are well known and will not be elaborated upon here.

It is noted that the CP might be co-located with the network negotiating party. The same may be said of the network object relocation service interface. The CP could be co-located with the relocation service, or the CP could interact with a distant network relocation service through a local client.

Also shown are mechanisms and methods for replicating itself within and between networks. These include the re-location methods 50, and re-location protocol interface 52. The relocation protocol interface is a protocol for communicating with a relocation service provided within network.

In the event a service is needed from a different network, for example due to roaming, the relocation methods 50 are invoked to relocate/replicate the CP to the other network. The relocation methods activate and manage the network support functions for relocating a CP. These services would include, for example, packing and unpacking of the CP software entity, reliable transferring of the CP to the new network, and ensuring that the CP was provided with any information required for it to begin operation within the new network. The relocation methods may also perform authentication and authorization related activities, if required by the new network. In typical scenarios, many of the activities performed by the relocation methods can be completed well ahead of the actual relocation operation, to minimize any delay in establishing the CP in the new network. The mechanisms for relocation are specific to a selected object relocation technology.

Any suitable relocation mechanism may be employed. For example, the above referenced Telescript (General Magic Inc.) object relocation technology (U.S. Pat. No. 5,603,031) and Java (Sun Microsystems Inc.) and Java++ (Microsoft Corporation) based object relocating capabilities may be used to relocate the CP from one network to another. However, it is noted that these existing systems do not provide the CP capability per se. These and other technologies for object relocation work even if the platforms are different, providing execution environments which allow running on different platforms.

There is a run-time engine interface 54 responsible for interacting with a re-locatable objects run-time engine 56 on whatever platform is responsible for running the CP. The run-time engine, and the corresponding run-time engine interface, is specific to the selected object relocation technology.

It is noted that the original source of the CP is not important. For example, the CP could originate with the end user device itself, and be sent from the end user device to the network. A server somewhere could be configured to have these CPs for various users, and the end user device can provide the server location and instructions to the network to download the CP. The network could already have obtained the CP on its own initiative.

It is noted that the CP communicates with the end user device in a language that the end user device understands. This language does not necessarily need to be standardized. Advantageously, a custom protocol can be defined for a given end user device in which code words are used to summarize entire services being requested thereby reducing even further the amount of signalling that needs to be performed between the end user device and the CP in the network. On the basis of such a code word received from an end user device, the associated CP knows what is being requested and what are the negotiation parameters.

At least one node in each network needs to have the facility to relocate the CPs and support and run the CPs. In the simplest implementation, there is only one node in each network which has this functionality for all end user devices in that network. Networks need to know or be able to learn quickly which node is responsible in each network for the CP functionality.

Numerous modifications and variations of the present invention are possible in light of the above teachings. It is therefore to be understood that within the scope of the appended claims, the invention may be practised otherwise than as specifically described herein.

In the above described embodiments, there is a one to one correspondence between relocatable devices and CPs. More generally, a CP may be designed to support small groups of end devices as opposed to individual end devices. These groups of end devices would need to share a common definition for the services needed from the networks. In this case, there would be multiple instances of the CP created when the users supported by the CP are in different networks.

The invention claimed is:

1. A non-transitory computer readable memory medium storing a software entity, wherein the software entity is located in a first network; wherein the software entity is at least one object, wherein the software entity is associated with a relocatable device, wherein the software entity is configured to be transferred by an object relocation service from the first network to a second network, wherein the software entity is required for negotiation of services for the relocatable device from the first network, and wherein the software entity is further required for negotiation of services for the relocatable device from the second network when transferred to the second network.

2. The non-transitory computer readable memory medium according to claim 1, wherein the software entity is associated with a plurality of relocatable devices, including the relocatable device, wherein the software entity is required for negotiation of services for the plurality of relocatable devices from the first network, and wherein the software entity is further required for negotiation of services for the plurality of relocatable devices from the second network when the software entity is transferred to the second network.

3. The non-transitory computer readable memory medium of claim 1 wherein the software entity comprises:
   a first interface to communicate with the relocatable device.

4. The non-transitory computer readable memory medium of claim 3 wherein the software entity further comprises:
   a second interface to communicate with a network service provider entity of a network within which the software entity is operating.

5. The non-transitory computer readable memory medium of claim 4 wherein the software entity further comprises:
   a third interface to communicate with a run-time engine in the network within which the software entity is operating, the run-time engine being responsible for running the software entity.

6. The non-transitory computer readable memory medium of claim 1 wherein the relocatable device is a wireless terminal.

7. The non-transitory computer readable memory medium of claim 1 wherein the relocatable device is a wired terminal.

8. The non-transitory computer readable memory medium of claim 1 wherein the software entity is configured to support custom service signaling and custom service negotiation for the relocatable device according to a user's preferences with minimal signaling overhead on a link between the first network or the second network and the relocatable device.

9. A network node of a network, the network node comprising:
   a processor and a memory, the memory having stored thereon a software entity relocatable by an object relocation service, wherein the software entity is at least one object;
   the network node being configured to:
      receive the software entity for a relocatable device when the relocatable device has moved or will move its point of attachment to be within the network;
      run the object relocation service to relocate the software entity; and
      negotiate services for the relocatable device via the software entity.

10. The network node of claim 9 wherein the software entity comprises:
    a first interface to communicate with the relocatable device;
    a second interface to communicate with a network service provider entity of the network;
    a third interface to communicate with a run-time engine responsible for running the software entity.

11. The network node of claim 10, wherein the second interface for interfacing with a network service provider entity of the network is adapted to communicate using a plurality of different protocol interfaces.

12. The network node of claim 10, wherein the software entity comprises:
    a fourth interface to communicate with the object relocation service.

13. The network node of claim 9, wherein the relocatable device is a wireless terminal.

14. The network node of claim 9, wherein the relocatable device is a wired terminal.

15. The network node of claim 9, wherein the software entity comprises:
    instructions for negotiating with the network, via a network service provider entity, services on behalf of the relocatable device using the negotiating basis.

16. The network node of claim 9, wherein the software entity is configured to support custom service signaling and custom service negotiation for the relocatable device according to a user's preferences with minimal signaling overhead on a link between the network and the relocatable device.

* * * * *